June 23, 1959 V. J. SPARKS 2,891,571
MULTIPLE-BALL VALVE
Filed Oct. 5, 1955

INVENTOR.
Van J. Sparks
BY
ATTORNEY.

United States Patent Office 2,891,571
Patented June 23, 1959

2,891,571

MULTIPLE-BALL VALVE

Van J. Sparks, Kansas City, Mo.

Application October 5, 1955, Serial No. 538,708

4 Claims. (Cl. 137—512.1)

This invention relates to improvements in fluid control valves and particularly to suction and discharge valves for compressors, the primary object being to provide a long-lasting valve that is not likely to stick regardless of the speed of operation of the compressor and which is provided with a relatively large area for free flow of fluid therethrough when the valve is open.

Many attempts have been made to improve upon valves of the aforementioned character inasmuch as the overall capacity and efficiency of the compressor is dependent to a great extent upon valve operation. High speed operation of present day compressors has placed a tremendous load upon the control valves and replacement requirements have accordingly been extended. The primary difficulty arises from the tremendous abuse to which the valves are subjected and some attempts to overcome the problem have resulted in valve sticking problems particularly at slower speeds. Still further, conventional valving arrangements oftentimes restrict the flow of fluid and thereby reduce the efficiency of the compressor as a whole.

It is the most important object of the present invention, therefore, to provide a valve of the multiple-ball type and including novel means for permitting free flow of fluid therethrough when the balls are unseated and, therefore, in the open position.

Another object of this invention is to provide a valve having reciprocable balls as a part thereof controlled both by inertia and by pressure differentials, the balls being confined within a relatively solid and, therefore, strong, rigid, long-lasting body.

A further object of this invention is to provide a multiple-ball valve having fluid flow bores therethrough enlarged intermediate the ends thereof for receiving the balls and provided with slots interconnecting the bores in a manner to permit maximum flow of fluid when the balls are at one end of the cavities away from the normally closed seated position.

Other objects include important details of construction, all of which will be made clear or become apparent as the following specification progresses, reference being had to the accompanying drawing, wherein:

Figure 1 is a plan view of a multiple-ball valve made according to the present invention showing the same connected to a reciprocable piston of a compressor or the like.

Figure 1:
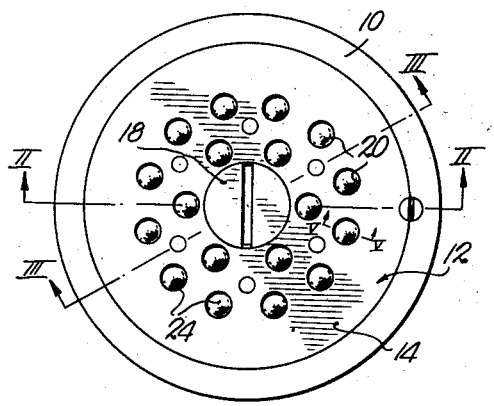

While the valve about to be described has been designed particularly for use with ammonia compressors of the vertically reciprocating piston type, it is to be appreciated that the same may have many additional uses. Further, in Figs. 1 and 2 of the drawing, the valve has been shown operably mounted in piston 10 of such compressor but the same construction may be employed in the discharge valve of the compressor, as well as the suction valve thereof.

It consists of a body broadly designated by the numeral 12 and having a pair of plates 14 and 16 interconnected in some suitable manner as by use of a central bolt and nut means 18 which clamps the innermost faces of the plates 14 and 16 into tight interengagement.

Figure 4:
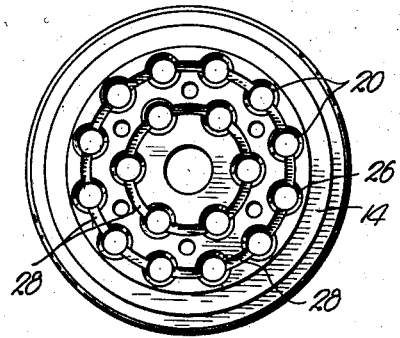
Fig. 4 is an inverted view of the innermost face of the top plate of the valve with the balls removed.

Body 12 is provided with a plurality of bores therethrough, arranged for example, in concentric rows as best seen in Figs. 1 and 4, there being a number of bores 20 in plate 14 aligned with bores 22 in plate 16. The diameters of the bores 20 and 22 are less than the diameters of balls 24 which are in turn confined within cavities 26. Cavities 26 are formed by counterboring the bores 20 from the innermost face of the plate 14 and are manifestly sufficiently large in diameter to permit free unrestricted, vertical reciprocation of the balls 24 in their respective cavities 26.

Figure 2:
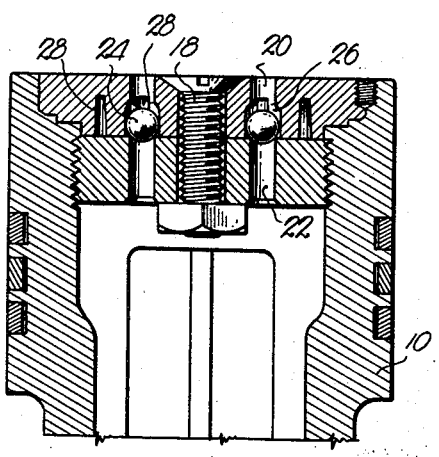
Fig. 2 is a fragmentary, cross-sectional view taken on line II—II of Fig. 1.
Figure 5:
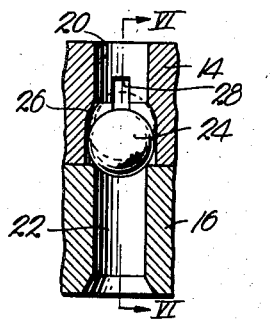
Fig. 5 is an enlarged, fragmentary, detailed, cross-sectional view taken on line V—V of Fig. 1.
Figure 6:
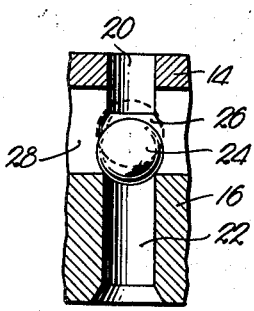
Fig. 6 is a fragmentary, detailed, cross-sectional view taken on line VI—VI of Fig. 5.
Figure 3:
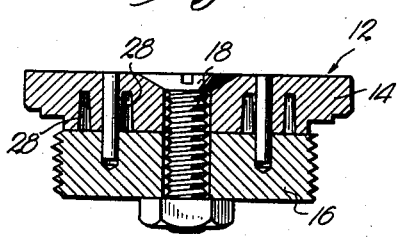
Fig. 3 is a cross-sectional view taken on line III—III of Fig. 1 but showing the valve removed from the said piston.

Normally, as seen in Figs. 2, 5 and 6 of the drawing, the balls 24 are seated against the uppermost or innermost face of the plate 16 in closing relationship to the bores 22 blocking the flow of fluid downwardly through the bores 20 and 22. To the end that fluid will, however, flow freely through the bores 20 and 22 when the balls 24 are at the uppermost ends of their paths of travel, i.e., at the innermost ends of the cavities 26, there is provided passage means in the nature of slots 28 for receiving the fluid and permitting the same to flow from the bores 22, through the cavities 26, and thence through the bores 20.

To the end that there is substantially unrestricted flow of fluid and there is presented a relatively large flow area for the fluid, slots 28 are preferably in interconnecting relationship to the cavities 26, as well as a portion of the bores 20 above the cavities 26.

As seen, therefore, in Fig. 4 of the drawing, the slots 28 are circular and concentric connecting each circular row of cavities 26 and extend upwardly and outwardly from the innermost face of the plate 14 within which the slots 28 are formed.

As seen in Figs. 2, 5 and 6, the slots 28 extend upwardly beyond the uppermost ends of the cavities 26; consequently, when the balls 24 are in the position shown by dotted lines in Figs. 5 and 6, the fluid is free to flow from the cavities 26 alongside the balls 24 and into the bores 20.

When used as a suction valve in a compressor as herein contemplated, the suction valve opens during the suction stroke of the piston 10 since quick downward movement of the piston 10 causes the balls 24 to be projected upwardly to the uppermost ends of the cavities 26. Fluid pressure moving upwardly through the bores 22 also holds the balls 24 at the uppermost ends of their paths of travel, but such fluid is free to move through the bores 20 toward the normally closed discharge valve thereabove and carried by the safety head of the compressor in the usual manner. On the compression stroke of piston 10, balls 24 are immediately seated in the position shown in Fig. 2 not only by gravity, but by the fluid pressure thereabove and by virtue of the construction illustrated in the drawing the tremendous forces acting upon the valve do not cause rapid wear as in the case of conventional valves of this type. The relatively solid body 12 within which the balls 24 are confined, as well as the balls 24 themselves, are capable of withstanding considerable abuse without undue wear.

When the valve construction hereinabove set forth is also used as the discharge valve of the compressor, the same advantageous results can be expected, thereby increasing the performance and life of the entire compressor within which the valve construction is used.

It is now also apparent from the foregoing that, by virtue of the fact that there is little resistance offered to free flow of fluid through the valve when the same is open, there is a substantial saving in cost of operating the compressor or other equipment with which the valve is adapted to be used.

Having thus described the invention what is claimed as new and desired to be secured by Letters Patent is:

1. A one-way valve of the kind described comprising a body provided with a plurality of elongated, straight, parallel bores therethrough each having an inlet end, a cylindrical inlet stretch adjacent the inlet end thereof, an outlet end, a cylindrical stretch adjacent the outlet end thereof, and an intermediate, generally cylindrical stretch extending between the inlet and outlet stretches and of greater diameter than either of the latter, the intermediate stretch of each bore presenting a ball-receiving cavity, the zone of juncture of the inlet stretch of each bore with the intermediate stretch thereof presenting a ball seat, the zone of juncture of the outlet stretch of each bore with the intermediate stretch presenting a ball travel-limiting stop; a spherical ball for each bore respectively of lesser diameter than the intermediate stretch thereof and of greater diameter than each of the inlet and outlet stretches thereof disposed within the intermediate stretch thereof; and means presenting a plurality of internal passages within the body connecting each bore with at least a pair of other bores, said passages communicating only with corresponding bores but communicating with each of the latter throughout a zone thereof traversing said zone of juncture between the outlet stretch and the intermediate stretch and including both a portion of the outlet stretch thereof extending upwardly from said stop and a portion of the intermediate stretch thereof contiguous to said outlet stretch portion thereof and spaced from said seat thereof.

2. In a valve as set forth in claim 1, wherein said body is comprised of a pair of separable, superimposed members having interengaged, generally flat opposed faces; and structure for releasably securing the members together with the faces in tight abutment, the inlet stretch of the bores being in one member, the intermediate and outlet stretches of the bores and the passages being in the other member, the inlet stretch of each bore being disposed for axial alignment with the intermediate and outlet stretches thereof.

3. In a valve as set forth in claim 2, wherein are provided interengaging male and female parts on the members for holding the members in a predetermined relationship effecting said alignment when the members are secured together by the structure with said faces in tight abutment.

4. In a valve as set forth in claim 2, wherein said bores are arranged in at least one generally annular series, and said means comprises an annular slot in said other member for each series respectively extending into said face of the other member and intersecting each of the bores of the corresponding series thereof.

References Cited in the file of this patent

UNITED STATES PATENTS

| | | |
|---|---|---|
| 342,478 | Tatum | May 25, 1886 |
| 1,054,794 | Riegel | Mar. 4, 1913 |
| 1,403,886 | Young | Jan. 17, 1922 |
| 1,483,153 | Baker | Feb. 12, 1924 |
| 1,587,877 | Vaughn | June 8, 1926 |
| 1,616,072 | Allerton | Feb. 1, 1927 |
| 2,569,734 | Saalfrank | Oct. 2, 1951 |